US005505590A

United States Patent [19]
Döhring

[11] Patent Number: 5,505,590
[45] Date of Patent: Apr. 9, 1996

[54] COMPOSITE TORQUE CONVERTER COMPONENTS

[75] Inventor: Klaus Döhring, Manchester, N.H.

[73] Assignee: Freudenberg-NOK General Partnership, Plymouth, Mich.

[21] Appl. No.: 233,252

[22] Filed: Apr. 26, 1994

[51] Int. Cl.[6] .................................................... F01D 5/30
[52] U.S. Cl. ..................... 416/180; 416/203; 416/229 R; 416/244 R
[58] Field of Search ................................. 416/180, 197 C, 416/229 R, 203, 241 R, 241 A, 244 R

[56] References Cited

U.S. PATENT DOCUMENTS

| | | | |
|---|---|---|---|
| D. 262,791 | 1/1982 | Piarulli et al. | 416/203 |
| 1,905,891 | 4/1933 | Blanchard | 416/234 |
| 2,222,444 | 11/1940 | Schmidt et al. | 416/203 |
| 2,745,352 | 5/1956 | Zeidler | 416/244 R |
| 3,285,502 | 11/1966 | Wooden | 416/244 R |
| 3,386,244 | 6/1968 | Helmer | 416/180 |
| 5,201,635 | 4/1993 | Steinmetz | 416/229 R |
| 5,226,807 | 7/1993 | By et al. | |

Primary Examiner—Edward K. Look
Assistant Examiner—James A. Larson
Attorney, Agent, or Firm—Dinnin & Dunn

[57] ABSTRACT

An improved torque converter assembly utilizing or making use of the same or similar composite materials for each component of the torque converter to result in a high strength yet light weight torque converter assembly which may be easily recycled. Further, the torque converter includes a unique hub member having integral fingers radially extending therefrom for use in bonding hub member to a multi-bladed body such as a turbine, wherein the fingers are circumferentially spaced about an outer circumferential surface on the hub member such that the spacing between a common finger and adjacent fingers on each side thereof is not equal. Such a hub member distributes the loads and stresses onto different planes extending radially and transverse the longitudinal axis of the hub member.

16 Claims, 7 Drawing Sheets

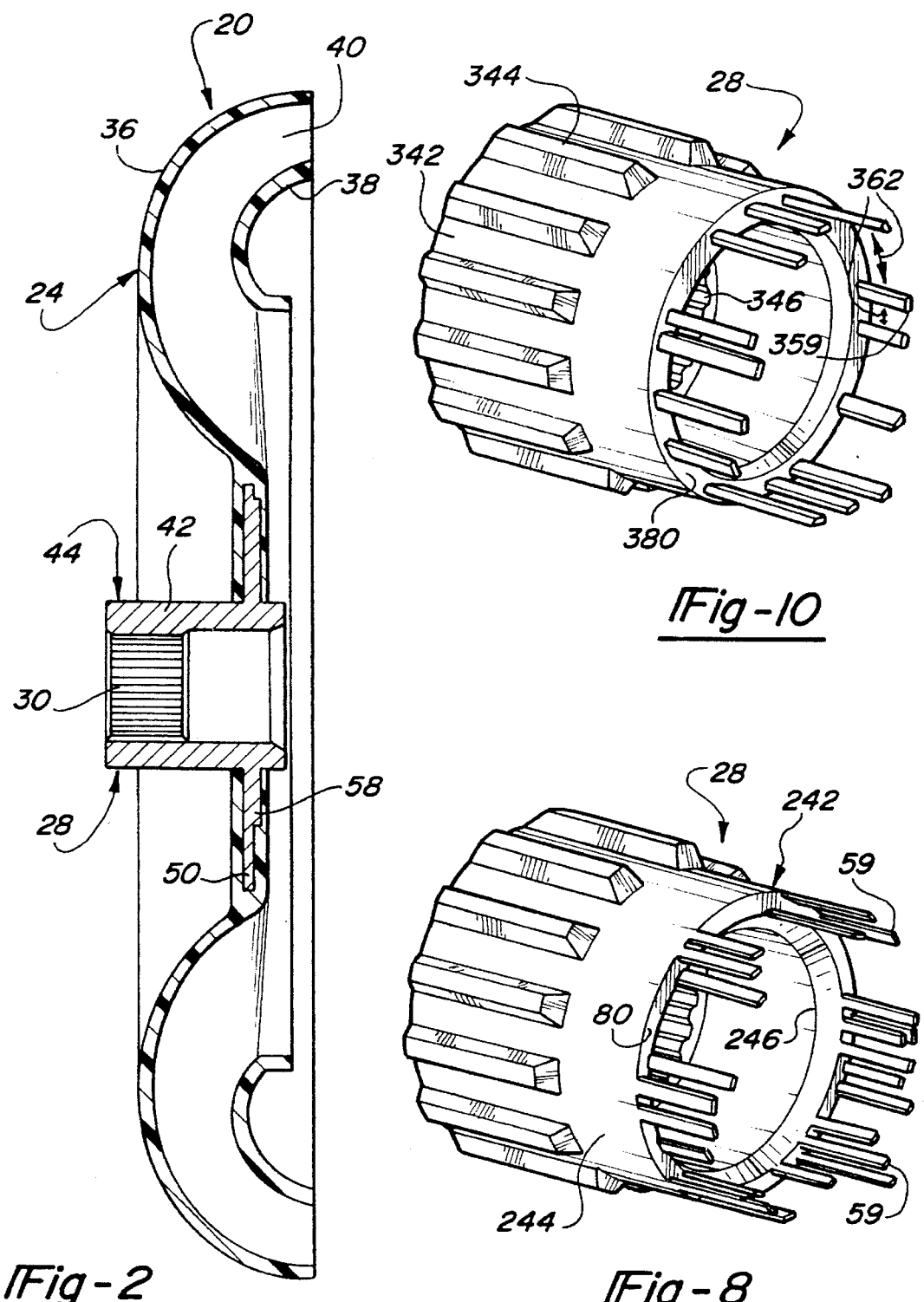

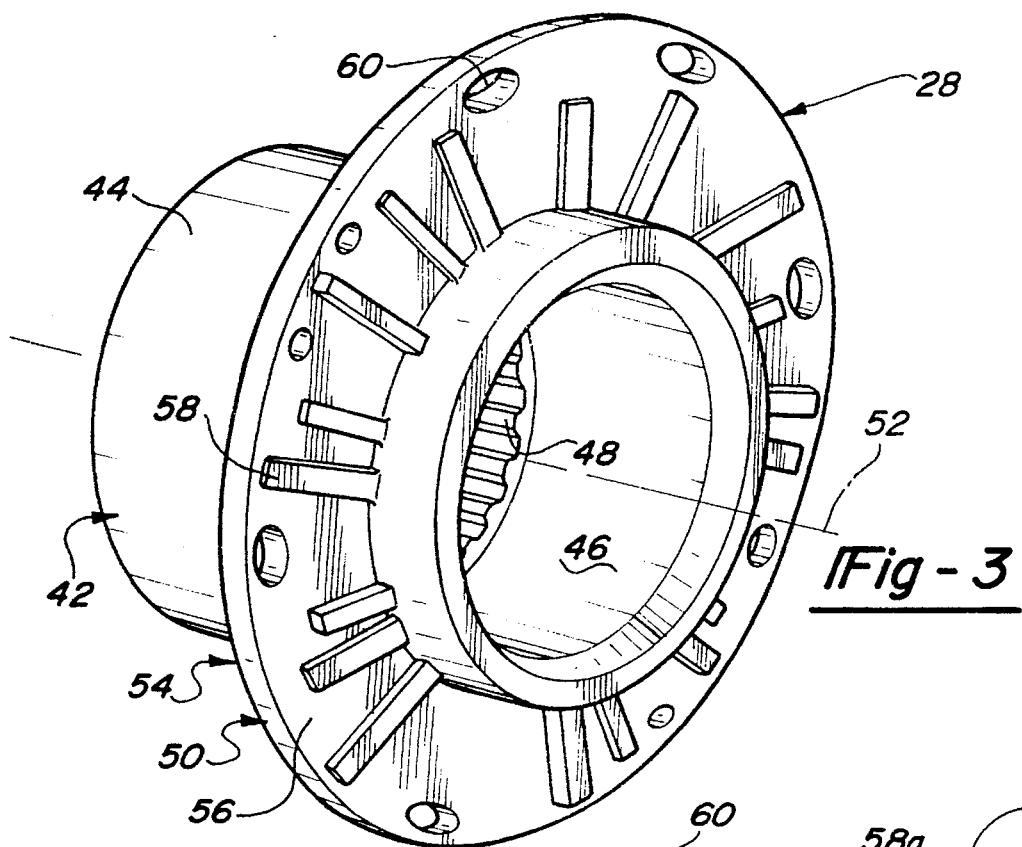
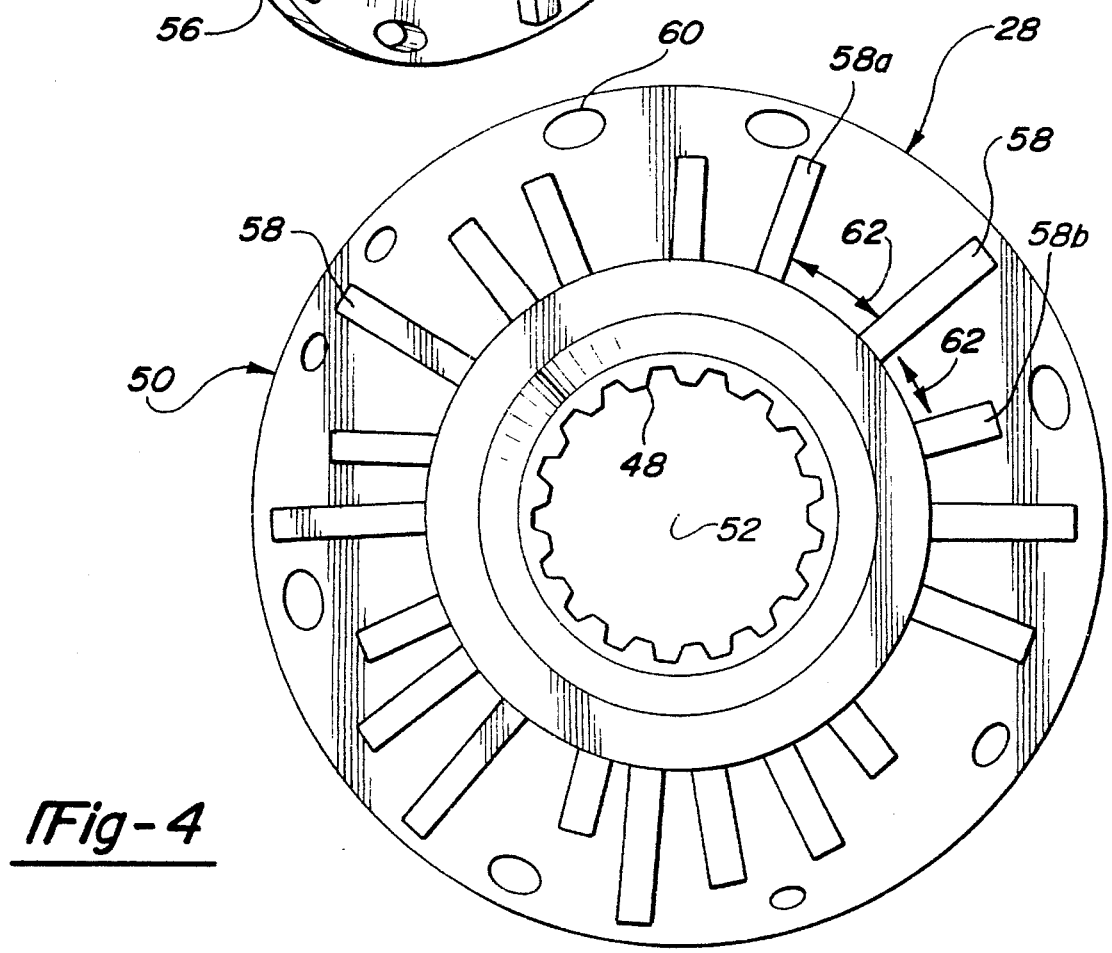

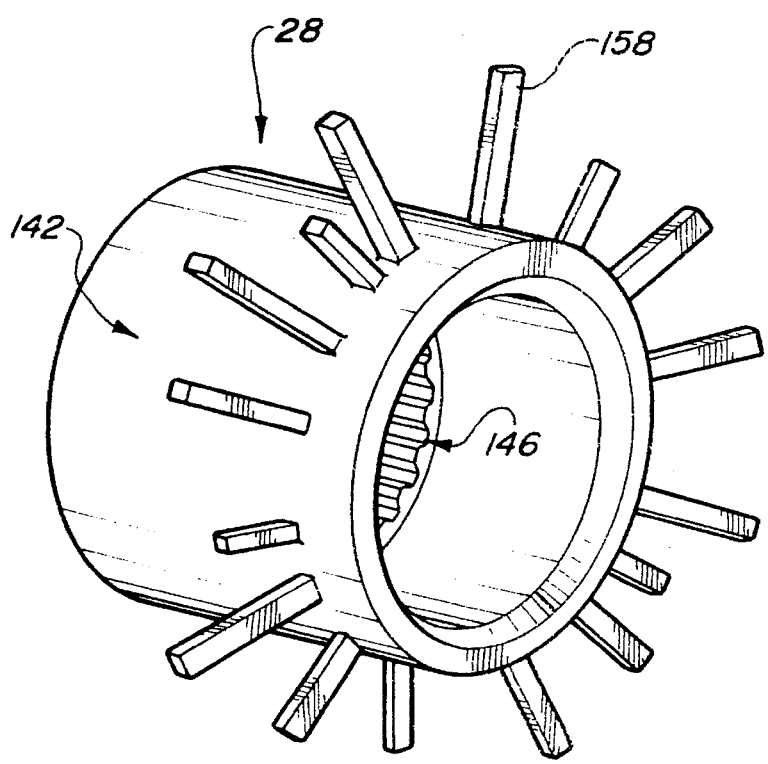
Fig-5
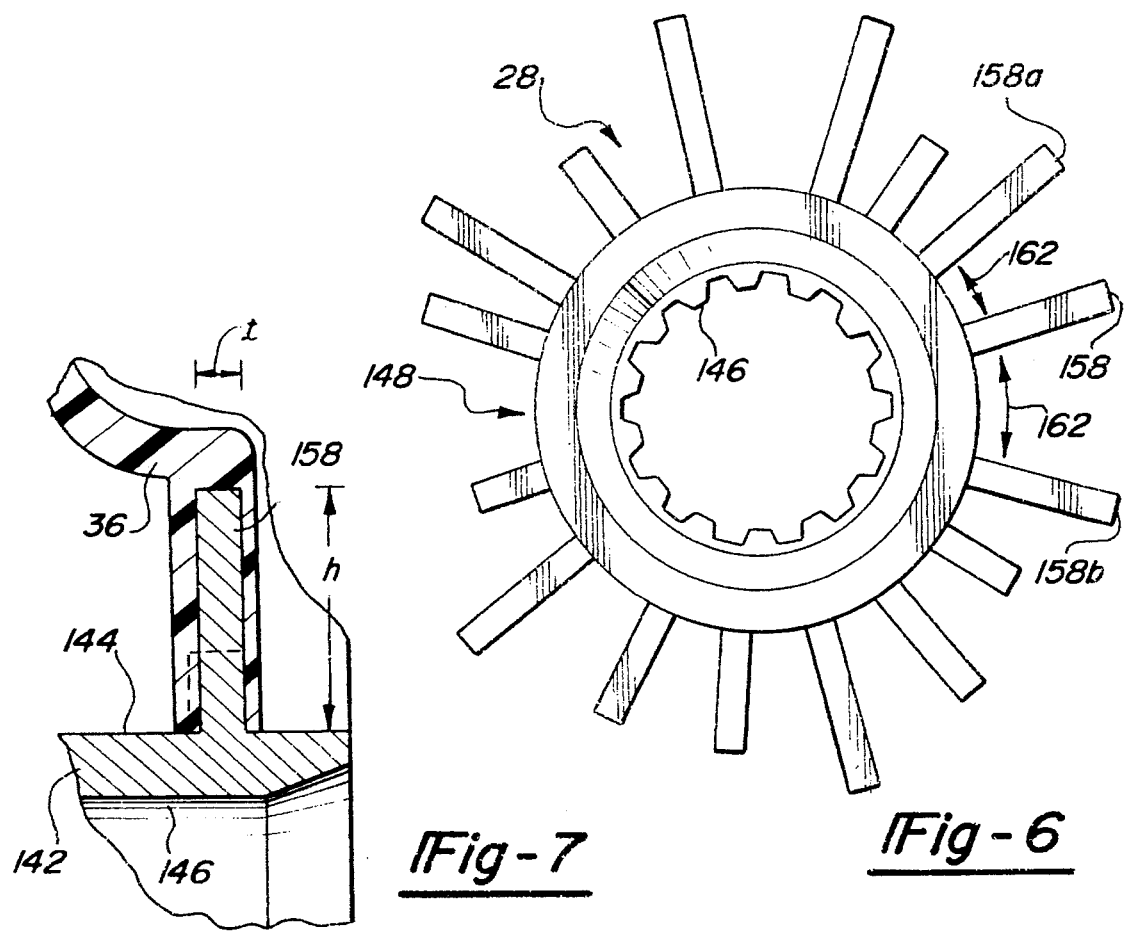
Fig-7
Fig-6

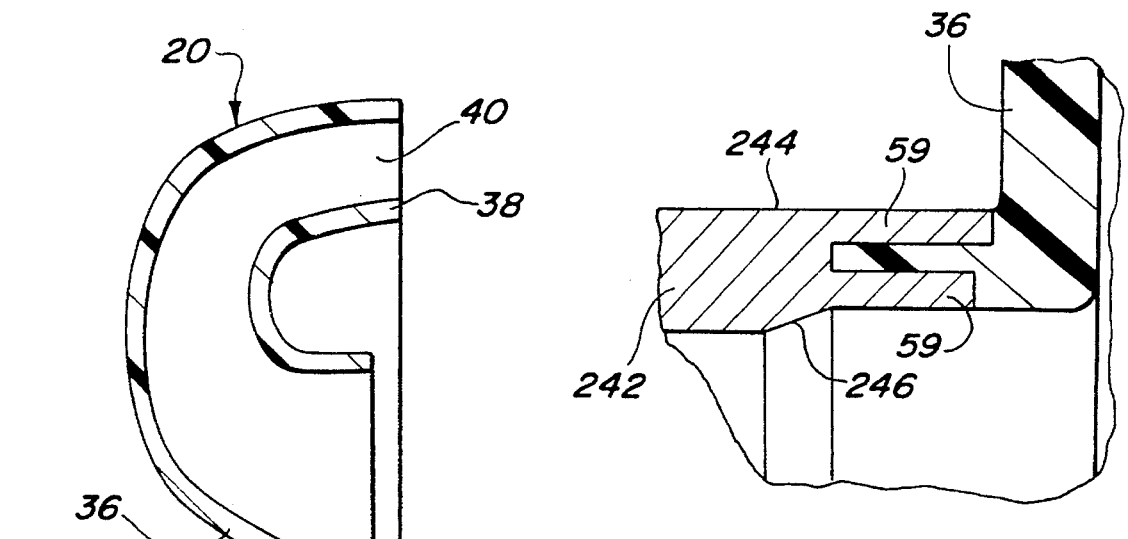
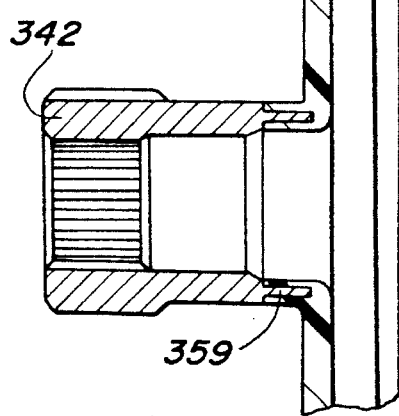
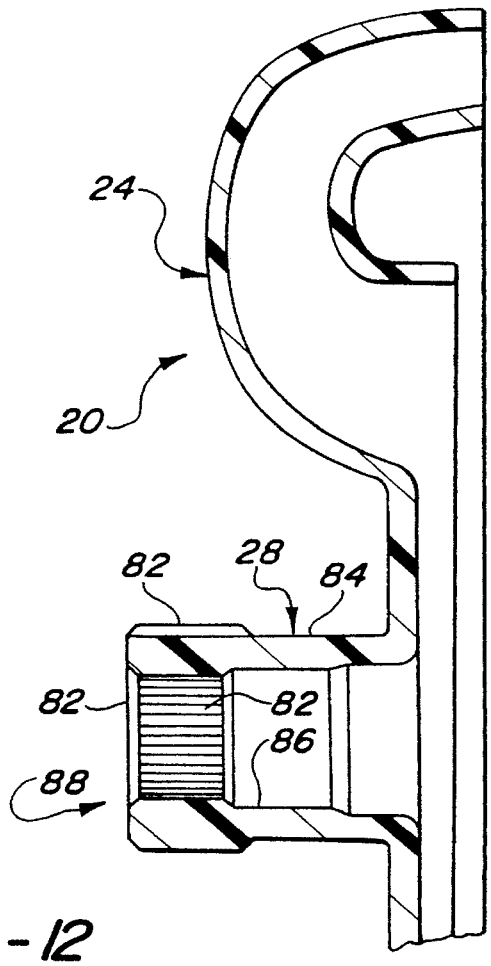

COMPOSITE TORQUE CONVERTER COMPONENTS

BACKGROUND AND SUMMARY OF THE INVENTION

1. Field of the Invention

The present invention relates to torque converters generally comprised of the following components, an impeller, a stator and a turbine. More specifically the present invention relates to integrally molded torque converter components.

2. Description of the Related Art

Power transmission systems for use in an automotive vehicle typically include a torque converter. The torque converter is used to fluidly couple the crankshaft of an internal combustion engine to a set of gears used to rotate a drive shaft. The torque converter normally includes an impeller, turbine, stator and housing assembled as a unit.

Torque converters have previously been made from ferrous materials. Further, the prior art includes a turbine for use in a torque converter having an injection molded composite plastic body formed about a ferrous material hub, typically through a "lost core" molding technique. As disclosed in U.S. Pat. No. 5,226,807, the ferrous hub includes a circumferential disc-shaped flange and a plurality of even length, evenly spaced rib members radiating outward from the center of the hub in a spoke-like fashion. Additionally, identically sized apertures extend transversely through the flange, wherein each aperture is generally centered between adjacent pairs of ribs.

Further, torque converters are typically made of a ferrous material and are assembled just prior to being inserted into a vehicle transmission. This creates additional assembly time and results in decreased production time per unit. Finally, the components of prior art torque convertors are manufactured from various materials; i.e., composite materials, ferrous and nonferrous metals which results in increased recycling costs. Thus, there is a need in the art for a composite torque converter assembly, comprised of as many material common elements as possible to reduce the cost of and facilitate the recycling procedure.

SUMMARY OF THE PRESENT INVENTION

Accordingly, the present invention is a turbine component having a unique hub/blade element interlock. In general, the interlock includes a cylindrical hub member having a plurality of radially projecting fingers, the fingers are distributed unevenly about a circumferential surface of the cylindrical hub member such that the circumferential spacing between a common finger and adjacent fingers on each side thereof is not equal. Additionally, the fingers vary with respect to height, width and thickness such that no two adjacent fingers are equal in size. A further aspect of the present invention includes a composite material housing and impeller. The composite materials are such that the housing can be friction welded to the impeller to form a unitary, composite torque converter assembly. The assembly may be filled with fluid prior to insertion in the vehicle transmission.

One advantage of the present invention is that varying the length, spacing and dimensional characteristics of the fingers distributes the loads and stresses in different radial planes. Further, varying the thicknesses of the fingers along the axial length of the cylindrical hub member, distributes the loads and stresses onto different planes extending transverse to a longitudinal axis of the hub member.

A further advantage of the present invention is that the use of the same or similar composite materials for each component of the torque converter results in a high strength yet lightweight torque converter assembly which may be easily recycled. Further, such a torque converter results in an improvement in the power output rating and reduces fuel consumption with respect to the vehicle engine.

Other objects, features and advantages of the present invention will be more apparent from the following description and drawings.

BRIEF DESCRIPTION OF THE DRAWINGS

FIG. 2 is a sectional side view of a turbine utilizing a hub member according to the present invention.

FIG. 3 is a perspective view of the hub member of FIG. 2.

FIG. 4 is a front view of the hub member of FIG. 3.

FIG. 5 is a perspective view of a second embodiment of a hub member according to the present invention.

FIG. 6 is a front view of the hub member of FIG. 5.

FIG. 7 is a partial sectional view of a turbine utilizing a hub member according to the second embodiment.

FIG. 8 is a perspective view of a third embodiment of a hub member according to the present invention.

FIG. 9 is a partial section view of a turbine utilizing a hub member according to the third embodiment.

FIG. 10 is a fourth embodiment of a hub member according to the present invention.

FIG. 11 is a partial side view of a turbine utilizing a hub member according to the fourth embodiment.

FIG. 12 is a fifth embodiment of the present invention showing a composite hub member and turbine.

DETAILED DESCRIPTION OF THE PREFERRED EMBODIMENT(S)

Figure 1:
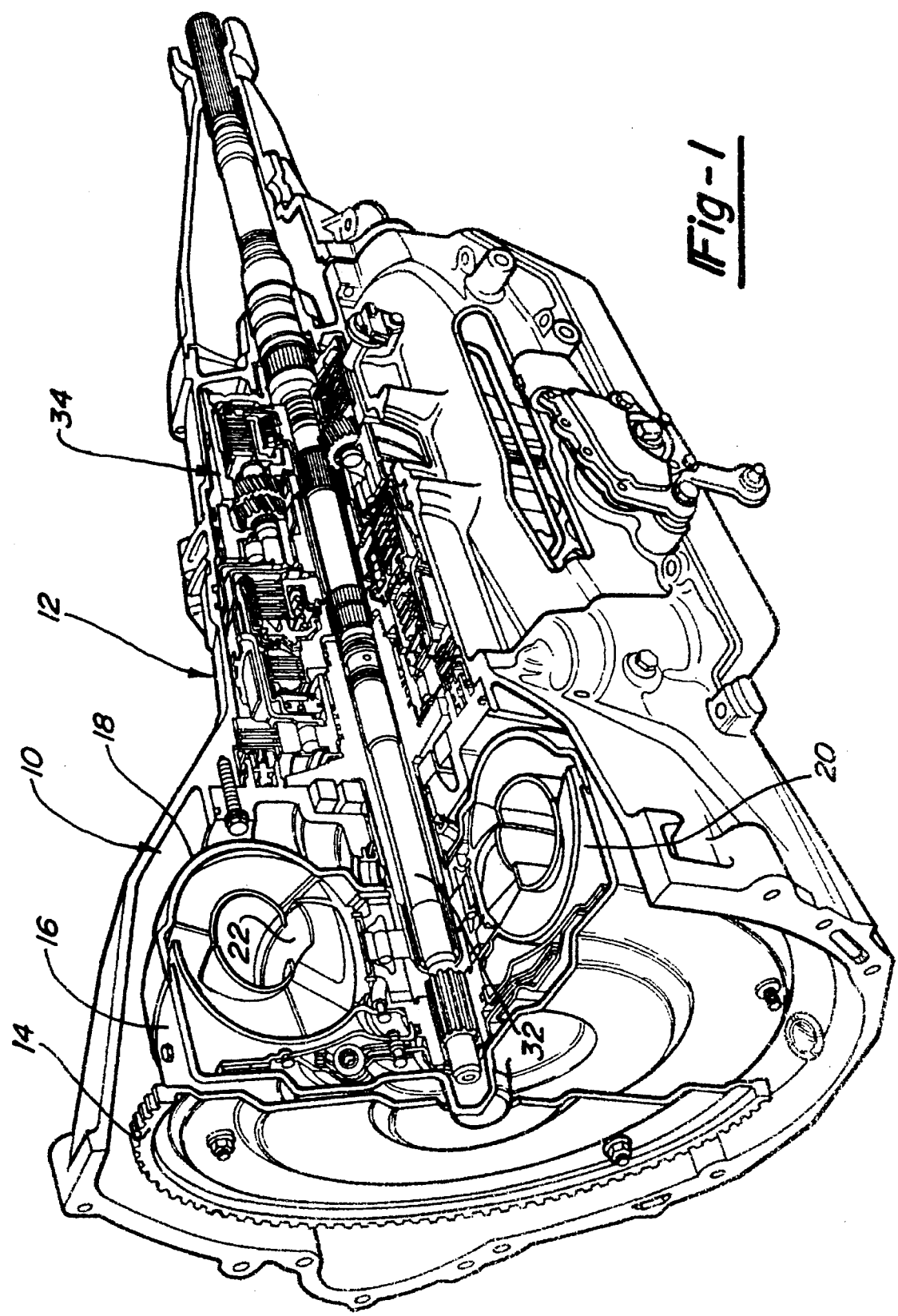
FIG. 1 is a perspective view of an automatic transmission with portions removed for clarity and illustrating a torque converter including a multi-segmented, multi-bladed component, such as a turbine.

Turning now to the drawings and more particularly to FIG. 1 thereof a torque converter 10 according to the present invention is illustrated in operational relationship with a transmission, generally indicated at 12. The transmission 12 is used to transmit power from a rotating crankshaft (not shown), such as is found in an automobile engine, to a drive unit (not shown) connected to one or more drive wheels. As illustrated in FIG. 1, power is transmitted from the rotating crankshaft to a flywheel 14. The flywheel 14 is connected to the torque converter 10. The torque converter 10 generally comprises a converter housing 16 attached to an impeller 18 which rotates with the crankshaft. The impeller 18 is fluidly connected, in a toroidal flow relationship with a turbine 20 and a stator 22. The turbine 20 includes a turbine body 24, formed about a turbine hub, shown generally at 28 (see FIG. 2), which is drivingly connected, typically by a spline connection 30, to a rotatable input member or shaft 32. A gear assembly (seen generally at 34) of the transmission 12 is engaged to the rotatable input member 32 and transfers power to the drive wheels.

It has been determined that a torque converter 10 manufactured out of a high strength, high temperature material provides a more efficient fluid flow versus use of ferrous materials. Such a torque converter 10 thereby results in better fuel economy, less noise and less vibration due to the lightweight nature and high strength of material that the torque converter 10 is made from.

Referring now to the FIG. 2, a turbine 20 of the type used in a torque converter 10 of the present invention is shown. The turbine body 24 is a multi-bladed element comprising a plastic outer shell 36, a plastic inner shell 38 and a plurality of blades 40 interconnecting the inner 38 and outer 36 shells. Additionally, as set forth, above a hub member 28 is mechanically connected to the outer shell 36. Typically during manufacture of the turbine 20 the body 24 is overmolded over the hub member 28, during an injection molding process. Such a process is known, see U.S. application Ser. No. 08/182,571 assigned to the assignee of the subject application, the disclosure of which is incorporated herein by reference. The hub member 28 is typically manufactured from various non-ferrous materials such as aluminum, powdered metal, and ceramics. Ferrous materials can also be used. The turbine body 24 is typically manufactured from a polymer substrate, e.g., a Stanyl 4/6 nylon with fifty percent glass reinforcing fibers. Other materials could also be used. Further, adhesives or bonding agents may be used to secure the hub member 28 to the turbine body 24. Several bonding agents suitable for use are: Multicure 625 with UV exposure and Multicure 625 with activator 535. Both can be purchased from Die Max Corporation of Torrington, Conn. Another suitable bonding agent is Permabond PB 922 which can be purchased from Permabond International, Bridgewater, N.J.

Figure 15:
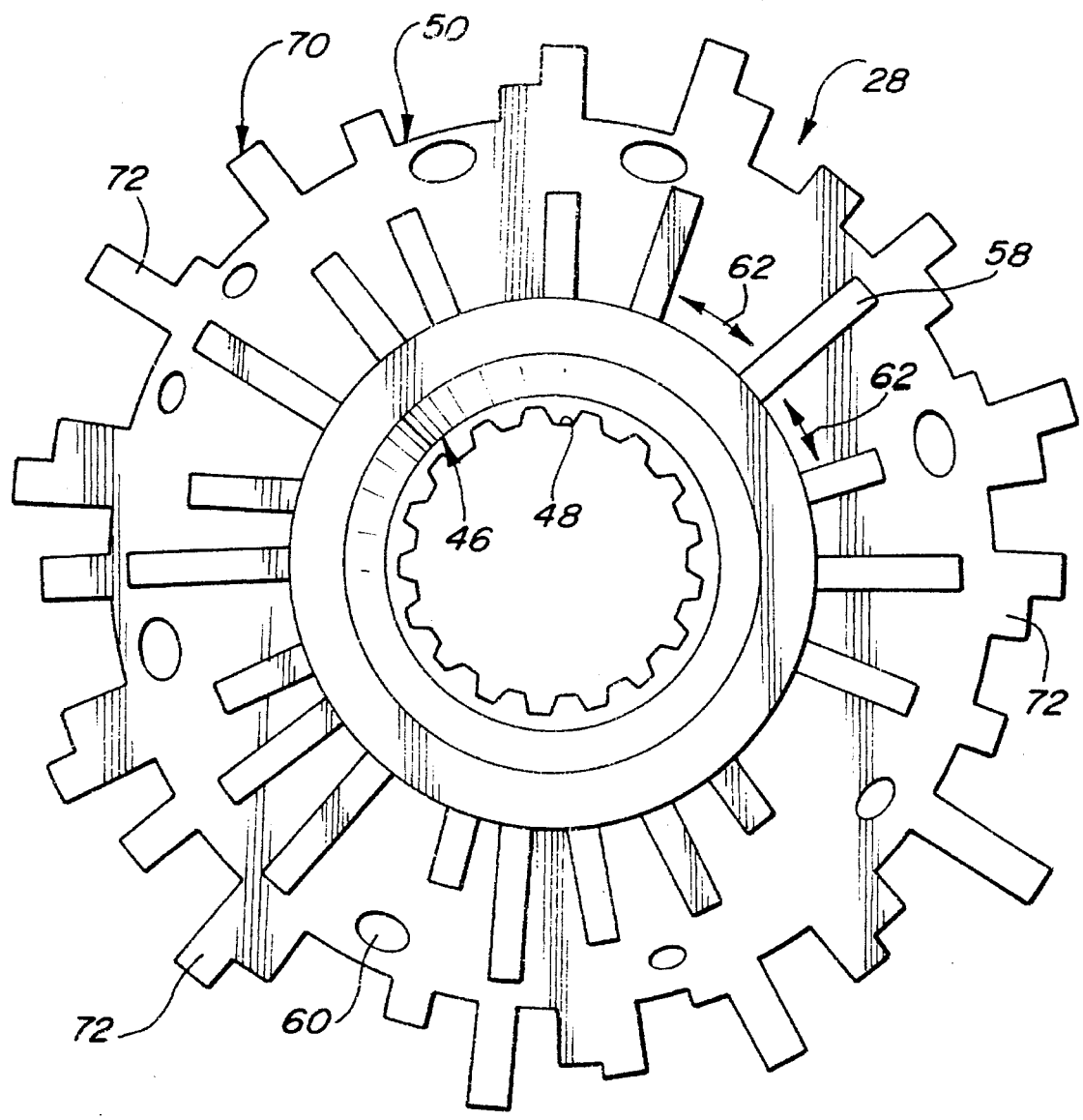
FIG. 15 is a front view of the sixth embodiment according to the present invention.

As illustrated in FIGS. 3 and 4, the hub member 28 includes a generally cylindrical body portion 42 having an outer circumferential surface 44 and an inner circumferential surface 46. The inner circumferential surface 46 includes a plurality of splines 48 for connecting the turbine 20 to the input shaft 32. An outwardly extending radial flange 50 is attached to the outer circumferential surface 44 transverse a longitudinal axis 52 of the cylindrical body portion 42. The flange can be disc shaped as shown in FIGS. 3 and 4 or may include an irregular or fractal surface 70. As illustrated in FIG. 15, the outer circumferential surface of the flange 50 comprises a plurality of outwardly extending projecting members 72 of various heights and widths. Such a fractal surface 70 spreads the loads or stresses occurring during use of the turbine 20 to various radial planes. The flange 50 includes a first 54 and a second 56 side. Protruding radially from the generally cylindrical body portion 42 and attached or connected to the flange 50 are fingers 58, the fingers 58 radiate outward from the center of the cylindrical body portion 42 in a generally spoke-like fashion. As shown in FIG. 4 the overall height of the fingers 58; i.e., the distance from the center of the hub member, is varied. Varying the height of the fingers 58 distributes the loads and stresses occurring during operation of the torque converter 10 in differing radial planes. Additionally, the flange 50 further includes a plurality of unevenly spaced voids 60 therein. While the voids 60 in FIGS. 3 and 4 are shown substantially oval shaped, this is for purposes of illustration only. The voids 60 may take different shapes and sizes and are unevenly spaced both a distance from the center and from adjoining fingers 58.

Despite the apparent unevenness of the fingers 58, the voids 60 and the flange 50, the entire hub member 28 must be rotationally balanced. This is normally accomplished by dividing the hub member 28 into sections wherein the mass of each section is equal regardless of the overall design or profile of the hub member 28. Additionally, the hub member 28 may be designed such that diametrically opposite sections have equal masses to provide sufficient balance of the hub member 28 during operation.

Additionally, the fingers 58 are spaced such that adjacent spacing 62; i.e., the spacing between a common finger 58 and adjacent fingers 58a, 58b on each side of the common finger is not equal.

Referring now to FIGS. 5 thru 7, a hub member 28 according to an alternative embodiment of the present invention is shown. Like parts of the hub member 28 have like reference numerals increased by 100. The hub member 28 includes a cylindrical body portion 142 having a splined inner circumferential surface 146. Extending outward from an outer circumferential surface 144 of the cylindrical body portion 142 are a plurality of radially projecting fingers 158. The fingers 158 vary in height(h) and thickness(t). Varying the respective heights and thicknesses of the fingers 158 distributes the loads and stresses in differing radial and axial planes. Further, the fingers 158 are circumferentially spaced such that the adjacent spacing 162; i.e., spacing between a common finger 158 and adjacent fingers 158a, 158b on each side of the common finger 158 is not the same.

Referring now to FIGS. 8–9, a hub member 28 according to a second alternative embodiment of the present invention is shown. Like parts of the hub have like reference numerals increased by a factor of 200. As shown in FIG. 8, the hub member 28 includes a cylindrical body portion 242 having a splined inner circumferential surface 246 and a splined outer circumferential surface 244 for engagement with the power shaft 32. The hub member 28 also includes axial projecting fingers 59 extending outward from one end 80 of the cylindrical body portion 242. Once again, the fingers 258 are of various heights and thicknesses to distribute the loads and stresses in differing planes. As illustrated in FIG. 8, the hub member 28 includes two sets of axially extending fingers 59 arranged concentrically about the center of the hub member 28.

Referring now to FIGS. 10 and 11 a third alternative embodiment of the hub member 28 is shown. Like parts have like reference numerals increased by a factor of 300. The hub member 28 includes splined inner 346 and outer 344 circumferential surfaces. The splined surface 344, 346 are used in a known manner to attach or connect the hub to engage the output member or shaft 32 connected to the gear assembly 34. A plurality of axial fingers 359 extend outward from the end face 380 of the hub member 28. The fingers are of various lengths and thicknesses. As set forth previously the fingers 359 are circumferential spaced such that the adjacent spacing 362 on each side of a finger 359 is not equal. Varying the finger spacing and design in this manner enables the loads and stresses to be distributed in different planes.

Referring now to FIG. 12, a fourth alternative embodiment of a hub member 28 and turbine body 24 is shown. The turbine 20 is of one piece, integral construction formed of a single composite material. In order to compensate for a loss in material strength when the hub is formed entirely of a composite material, additional teeth are used to transfer the torque. As shown in FIG. 12 the hub member 28 includes gear teeth 82 on an outer circumferential surface 84, an inner circumferential surface 86 and on a side or end face 88 of the turbine 20. Forming the turbine 20 in this manner reduces the stress on the individual gear teeth 82 by spreading the torque developed during operation of the torque converter 10 over as great an area as possible.

Figure 13:
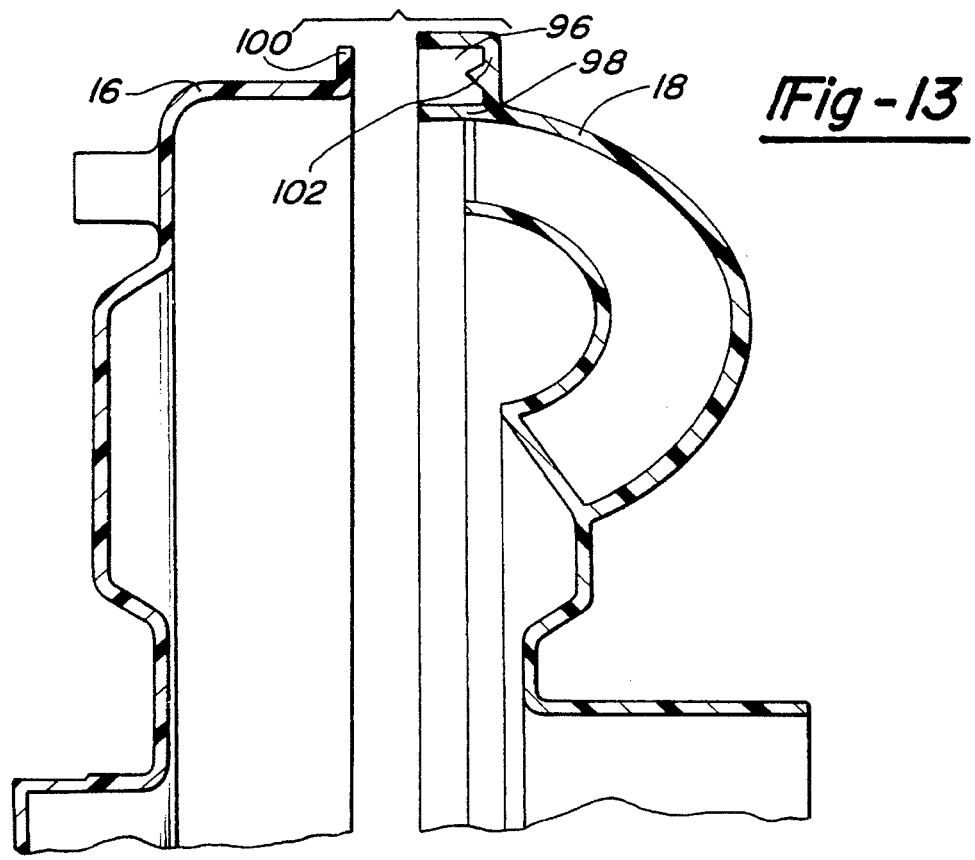
FIG. 13 is a side view of a torque converter assembly of the present invention.
Figure 14:
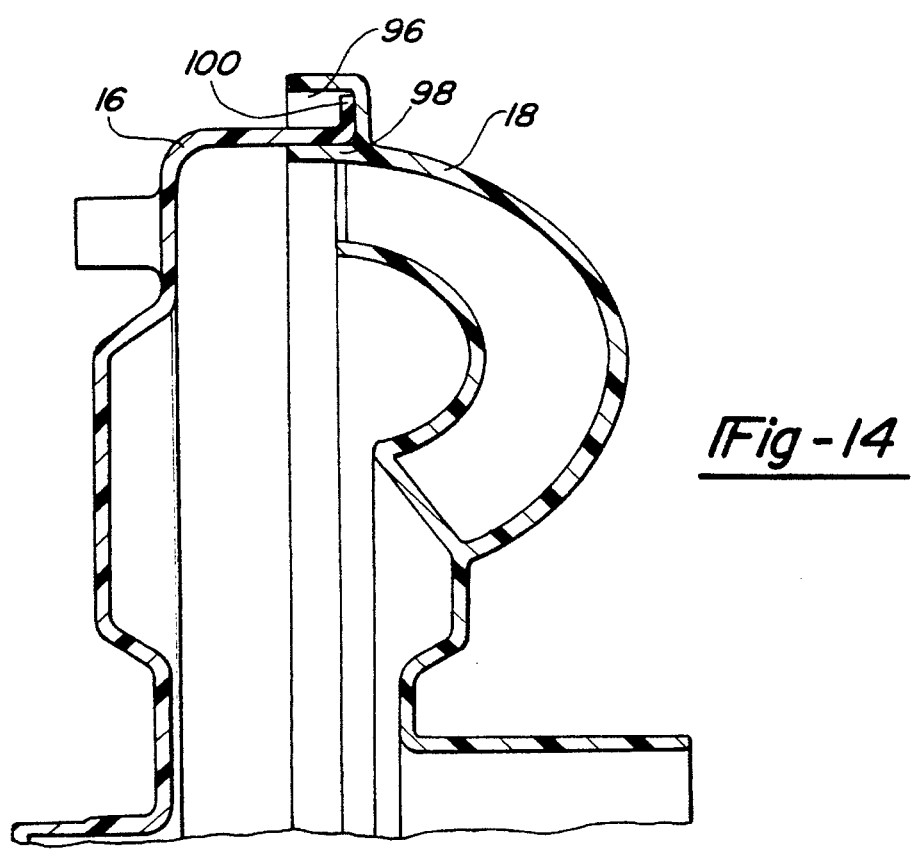
FIG. 14 is a cross sectional side view of the torque converter of the present invention showing the impeller and housing assembled.

Referring to FIGS. 13–14, an embodiment of an impeller 18 and housing 16 assembly is shown. As set forth previously the impeller 92 and housing 94 are both made of a thermoplastic material such as Stanyl 4/6 nylon. Because the pieces are formed of identical materials they may be spin welded together. While spin welding is preferred, the pieces may also be connected using any frictional welding process which sufficiently heats the base material to enable the pieces to be joined together. Other welding processes such as hot plate welding may also be used. As shown in FIG. 13, the impeller 18 contains a U-shaped channel 96 extending circumferentially about the outer radial edge 98 of the impeller 18. A complementary L-shaped flange 100 formed on the housing 16 is placed within the U-shaped channel 96. Spinning either the impeller 18 or housing 16 creates heat due to frictional forces and melts a small amount of material positioned within the U-shaped channel 96, illustrated in FIG. 13 as triangular shaped portion of material 102 located at the bottom of the U-shaped channel 96. As the triangular shaped portion of material 102 is heated, the material melts and bonds the impeller 18 and housing 16 together to form a unitary assembly. In practice, the impeller 18, stator 22, and turbine 20 are all assembled. The housing 16 is then connected to the impeller 18 by a spin-weld procedure as set forth above. Once assembled, the torque converter 10 is filled with fluid and sealed prior to assembly into the transmission 12. Manufacturing the torque converter 10 in this manner allows each of the components to be made of the same composite material to facilitate assembly and recycling procedures.

It should be appreciated that a torque converter 10 of the present invention provides a unique, lightweight and energy efficient assembly which can be recycled after the life of the transmission 12 has expired. Additionally, the turbine hub 28 and turbine body 24 interlock provides a unique connection system by which the stresses and loads in the turbine body 24 are distributed in different planes, thereby spreading the stresses occurring during operation over a greater portion of the turbine body 24.

Various changes can be made through the embodiments shown herein without departing from the scope of the present invention.

What is claimed is:

1. An apparatus for use in a torque converter comprising:
   a hub member;
   said hub member including a generally cylindrical body portion and a plurality of radially outward extending fingers, said fingers spaced unevenly on an outer circumferential surface of said body portion such that the spacing between a common finger and adjacent fingers on each side of said common finger is not equal; and
   a bladed element molded to said hub member.

2. An apparatus as set forth in claim 1 wherein said hub member is formed of a non-ferrous material.

3. An apparatus as set forth in claim 1 including a radially outward extending flange portion attached to said body portion.

4. An apparatus as set forth in claim 3 wherein an outer peripheral surface of said flange portion is a fractal surface.

5. An apparatus as set forth in claim 3 wherein said flange portion is adjacent and contacts said fingers.

6. An apparatus as set forth in claim 1 wherein the fingers have a height and thickness, at least one finger having a height and thickness varied from said remaining fingers.

7. An apparatus as set forth in claim 3 wherein said flange portion includes a plurality of apertures formed therein.

8. An apparatus as set forth in claim 7 wherein said apertures have a discreet size, at least one of said apertures having a size varied from said discreet size.

9. An apparatus for use in a torque converter comprising:
   a hub member, said hub member including a generally cylindrical body portion and a plurality of radially outward extending fingers, said fingers extending outward at various heights such that no two adjacent fingers are the same height; and
   a bladed element molded to said hub member.

10. An apparatus as set forth in claim 9 wherein said fingers are spaced unevenly on an outer circumferential surface of said body portion such that the spacing between a common finger and adjacent fingers on each side of said common finger is not equal.

11. An apparatus as set forth in claim 9 including a radially outward extending flange portion attached to said body portion.

12. An apparatus as set forth in claim 11 wherein an outer peripheral surface of said flange portion is a fractal surface.

13. An apparatus as set forth in claim 11 wherein said flange portion includes a plurality of apertures formed therein.

14. An apparatus as set forth in claim 9 wherein said hub member is formed of a non-ferrous material.

15. An apparatus for use in a torque converter comprising:
   a hub member, said hub member including a generally cylindrical body portion and a plurality of outwardly extending fingers, said fingers spaced unevenly on an outer surface of said body portion such that the spacing between a common finger and adjacent fingers on each side of said common finger is not equal; and
   a bladed element molded to said hub member.

16. An apparatus as set forth in claim 15 wherein said hub member is formed of a non-ferrous material.

* * * * *